(No Model.)
M. J. NAUGHTON.
BURIAL CASKET.
No. 262,092. Patented Aug. 1, 1882.
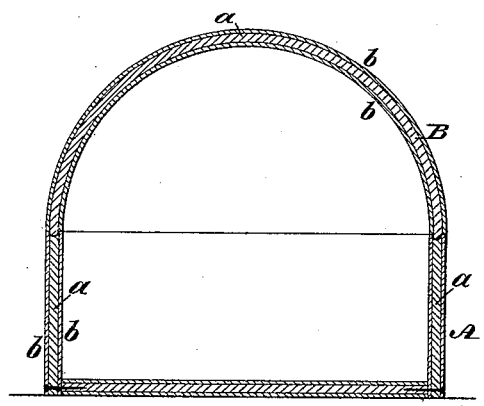
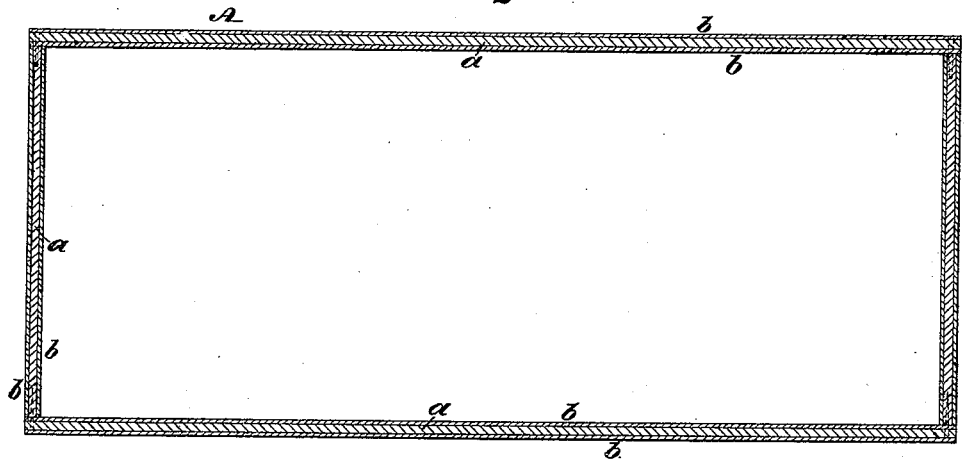
WITNESSES:
A. P. Grant,
H. F. Kircher
INVENTOR:
Michael J. Naughton,
BY John A. Niedersheim,
ATTORNEY.
N. PETERS, Photo-Lithographer, Washington, D. C.

UNITED STATES PATENT OFFICE.

MICHAEL J. NAUGHTON, OF PHILADELPHIA, PENNSYLVANIA.

BURIAL-CASKET.

SPECIFICATION forming part of Letters Patent No. 262,092, dated August 1, 1882.

Application filed July 3, 1882. (No model.)

*To all whom it may concern:*

Be it known that I, MICHAEL J. NAUGHTON, a citizen of the United States, residing in the city and county of Philadelphia, State of Pennsylvania, have invented a new and useful Improvement in Burial Cases, Caskets, and Coffins, which improvement is fully set forth in the following specification and accompanying drawings, in which—

Figure 1 is a transverse vertical section of a burial-case embodying my invention. Fig. 2 is a top or plan view of the body thereof.

Similar letters of reference indicate corresponding parts in the two figures.

My invention consists of a burial case, casket, or coffin formed of materials substantially as hereinafter described, whereby it is strong, light, durable, and inexpensive, and possesses a preservative nature both for itself and the corpse within it.

Referring to the drawings, A represents the body of a burial case, casket, or coffin, and B the lid thereof. The pieces from which the several parts of the case and lid are made are constructed of a composition of sawdust and asphaltum, as at *a*, which is molded into the required shape, and a sheathing, *b b*, of paper-felt.

A sheet of felt is laid on a table or in a mold of the shape of the required piece, the composition poured or worked thereover, and another sheet of felt placed on the molded composition, thus producing one of the pieces, the other pieces being similarly produced, it being seen that the sheathings of felt firmly adhere to the molded composition as one. If desired, the pieces may be subjected to pressure in order to increase their compactness and the adhesion of the parts. The parts of the casket are then put together and nailed or screwed, after which it may be lined or otherwise finished and ornamented, and is ready for use.

The sawdust avoids the use of boards, thus making the casket lighter and cheaper, and permits nails or screws to be driven through the composite pieces, of which it is a constituent. The pieces may be molded into any desired shape and pattern, thus saving the expense attending wood-working, the utilization of sawdust being also an important consideration.

The asphalt is of a preservative nature, both as to the casket and the corpse therein, and acts as a binder for the sawdust. The felt is also preservative and water-proof, the outside sheet preventing water reaching the composite pieces of the casket, and its nature is furthermore such that it protects the composition from the softening action of heat, whereby the shape of the casket is not changed during warm weather or in a warm room, &c.

The top of the body of the casket may be grooved to receive the ends of the lid with a sealing medium—such as pitch or tar—thus producing a tight joint, for evident purposes.

Having thus described my invention, what I claim as new, and desire to secure by Letters Patent, is—

The burial case, casket, or coffin formed of composite pieces of sawdust and asphaltum and felt sheathings, substantially as and for the purpose set forth.

MICHAEL J. NAUGHTON.

Witnesses:
 JOHN A. WIEDERSHEIM,
 W. F. KIRCHER.